United States Patent
Lee et al.

(10) Patent No.: US 10,053,552 B2
(45) Date of Patent: Aug. 21, 2018

(54) CONJUGATED DIENE-BASED POLYMER RUBBER COMPOSITION CONTAINING DISPERSANT

(71) Applicant: LG Chem, Ltd., Seoul (KR)

(72) Inventors: Ro-Mi Lee, Daejeon (KR); Youk-Reol Na, Daejeon (KR); No-Ma Kim, Daejeon (KR)

(73) Assignee: LG Chem, Ltd. (KR)

( * ) Notice: Subject to any disclaimer, the term of this patent is extended or adjusted under 35 U.S.C. 154(b) by 100 days.

(21) Appl. No.: 15/121,231

(22) PCT Filed: Nov. 4, 2015

(86) PCT No.: PCT/KR2015/011804
§ 371 (c)(1),
(2) Date: Aug. 24, 2016

(87) PCT Pub. No.: WO2016/085143
PCT Pub. Date: Jun. 2, 2016

(65) Prior Publication Data
US 2017/0009057 A1   Jan. 12, 2017

(30) Foreign Application Priority Data

Nov. 26, 2014  (KR) .................. 10-2014-0166286
Nov. 26, 2014  (KR) .................. 10-2014-0166675
Aug. 19, 2015  (KR) .................. 10-2015-0116530

(51) Int. Cl.
C08K 5/17       (2006.01)
B60C 1/00       (2006.01)
C08L 9/00       (2006.01)
C08C 19/44      (2006.01)

(52) U.S. Cl.
CPC .................. C08K 5/17 (2013.01); B60C 1/00 (2013.01); B60C 1/0016 (2013.01); C08C 19/44 (2013.01); C08L 9/00 (2013.01)

(58) Field of Classification Search
CPC ...................................... C08K 5/17
See application file for complete search history.

(56) References Cited

U.S. PATENT DOCUMENTS

| | | | |
|---|---|---|---|
| 4,231,883 A | 11/1980 | Malec | |
| 5,698,603 A | 12/1997 | Scherzer et al. | |
| 5,714,533 A | 2/1998 | Hatakeyama et al. | |
| 5,900,392 A | 5/1999 | Bernhard | |
| 9,034,961 B2 * | 5/2015 | Yagi | C08L 9/00 524/247 |
| 9,139,719 B2 * | 9/2015 | Hinohara | B60C 1/0016 |
| 9,695,256 B2 * | 7/2017 | Lee | C08F 8/42 |
| 2011/0172344 A1 | 7/2011 | Yoshida et al. | |
| 2011/0189495 A1 | 8/2011 | Pip | |
| 2013/0090422 A1 | 4/2013 | Hinohara et al. | |
| 2013/0324657 A1 | 12/2013 | Okada et al. | |
| 2013/0324667 A1 | 12/2013 | Yuasa et al. | |
| 2013/0345335 A1 | 12/2013 | Shibata et al. | |
| 2014/0228500 A1 | 8/2014 | Uesaka | |
| 2014/0243447 A1 | 8/2014 | Cho et al. | |
| 2014/0243476 A1 | 8/2014 | Lee et al. | |
| 2014/0323627 A1 | 10/2014 | Yagi et al. | |
| 2015/0376321 A1 | 12/2015 | Lee et al. | |
| 2016/0009903 A1 | 1/2016 | Morita et al. | |
| 2016/0177011 A1 | 6/2016 | Kim et al. | |
| 2016/0208023 A1 | 7/2016 | Lee et al. | |
| 2016/0208024 A1 | 7/2016 | Kim et al. | |

FOREIGN PATENT DOCUMENTS

| | | |
|---|---|---|
| CN | 103003347 A | 3/2013 |
| CN | 103525068 A | 1/2014 |
| EP | 2338919 A1 | 6/2011 |
| EP | 2746331 A | 6/2014 |
| JP | H04122745 A | 4/1992 |
| JP | 05009339 A * | 1/1993 |
| JP | 2002194139 A | 7/2002 |
| JP | 2013139491 A | 7/2013 |
| JP | 2013245306 A | 12/2013 |
| JP | 2016525626 A | 8/2016 |
| JP | 2016528369 A | 9/2016 |
| JP | 2016530376 A | 9/2016 |
| KR | 20130090811 A | 8/2013 |
| KR | 101310868 B1 | 10/2013 |
| KR | 20130132272 A | 12/2013 |
| KR | 20140001228 A | 1/2014 |
| KR | 20140008341 A | 1/2014 |
| KR | 20140008342 A | 1/2014 |
| KR | 20140127726 A | 11/2014 |
| WO | 1995031888 A2 | 11/1995 |
| WO | 2013058320 A1 | 4/2013 |
| WO | 2013094693 A1 | 6/2013 |
| WO | 2014133096 A1 | 9/2014 |
| WO | 2014175561 A | 10/2014 |

(Continued)

OTHER PUBLICATIONS

International Search Report from PCT/KR2015/011804, dated Feb. 23, 2016.
Extended European Search Report for Application No. EP15863063 dated May 3, 2017.

Primary Examiner — Vickey Nerangis
(74) Attorney, Agent, or Firm — Lerner, David, Littenberg, Krumholz & Mentlik, LLP

(57) ABSTRACT

Disclosed is a rubber composition, including a conjugated diene-based polymer and an amine compound.

8 Claims, No Drawings

(56) References Cited

FOREIGN PATENT DOCUMENTS

| WO | 2015056898 A1 | 4/2015 |
| WO | 2015056994 A1 | 4/2015 |
| WO | 2015057021 A1 | 4/2015 |
| WO | 2016085102 A1 | 6/2016 |
| WO | 2016089035 A1 | 6/2016 |

\* cited by examiner

CONJUGATED DIENE-BASED POLYMER RUBBER COMPOSITION CONTAINING DISPERSANT

CROSS-REFERENCE TO RELATED APPLICATION

This application is a national phase entry under 35 U.S.C. § 371 of International Application No. PCT/KR2015/011804, filed Nov. 4, 2015, which claims priority to Korean Patent Application No. 10-2014-0166675, filed Nov. 26, 2014, Korean Patent Application No. 10-2014-0166286, filed Nov. 26, 2014 and Korean Patent Application No. 10-2015-0116530, filed Aug. 19, 2015, the disclosures of which are incorporated herein by reference.

TECHNICAL FIELD

The present invention relates to a rubber composition and, more particularly, to a modified conjugated diene-based polymer rubber composition having superior tensile strength, wear resistance and wet skid resistance, as well as low rolling resistance.

BACKGROUND ART

Recently, in the vehicle industry, the demand for the durability, stability and fuel economy of vehicles is continuously increasing, and much effort is directed to satisfying the demand.

In particular, many attempts have been made to enhance the properties of rubber, as a material for vehicle tires, especially tire treads, which are in contact with roads. The rubber composition for a vehicle tire contains a conjugated diene-based polymer, such as polybutadiene or butadiene-styrene copolymer.

Thorough research is currently ongoing into the addition of various reinforcing agents to conjugated diene-based rubber compositions to increase the performance of vehicle tires. Specifically, as vehicles are required to exhibit stability, durability and fuel economy, rubber compositions having improved heat build-up and high wet skid resistance and mechanical strength are being developed as material for vehicle tires, especially tire treads, which are in contact with roads.

DISCLOSURE

Technical Problem

Accordingly, the present invention has been made keeping in mind the problems encountered in the related art, and an object of the present invention is to provide a rubber composition having superior tensile strength, wear resistance and wet skid resistance, as well as low rolling resistance.

Technical Solution

In order to accomplish the above object, the present invention provides a rubber composition, comprising a conjugated diene-based polymer and a compound represented by Chemical Formula 1 or Chemical Formula 2 below:

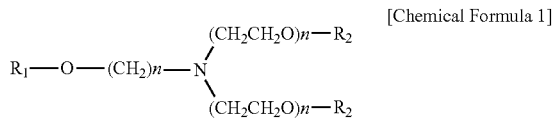

[Chemical Formula 1]

in Chemical Formula 1, $R_1$ is a C8-C24 aliphatic hydrocarbon group, $R_2$ is hydrogen or a C1-C3 aliphatic hydrocarbon group, and n is an integer of 1 to 10; and

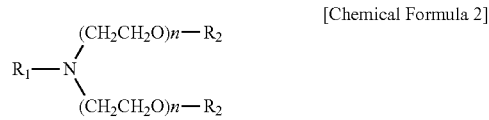

[Chemical Formula 2]

in Chemical Formula 2, $R_1$ is a C8-C24 aliphatic hydrocarbon group, $R_2$ is hydrogen or a C1-C3 aliphatic hydrocarbon group, and n is an integer of 1 to 10.

In addition, the present invention provides a tire or tire tread, comprising the above rubber composition.

Advantageous Effects

According to the present invention, a rubber composition, having superior tensile strength, wear resistance and wet skid resistance, as well as low rolling resistance, can be applied to tires.

BEST MODE

Hereinafter, a detailed description will be given of the present invention.

The present invention addresses a rubber composition, comprising a conjugated diene-based polymer and a compound represented by Chemical Formula 1 or Chemical Formula 2 below:

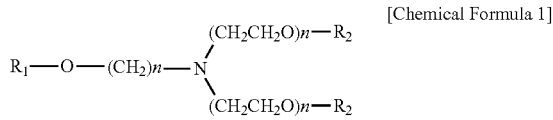

[Chemical Formula 1]

in Chemical Formula 1, $R_1$ is a C8-C24 aliphatic hydrocarbon group, $R_2$ is hydrogen or a C1-C3 aliphatic hydrocarbon group, and n is an integer of 1 to 10; and

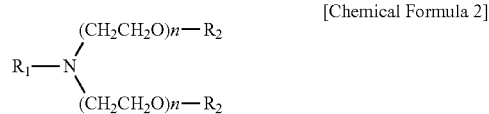

[Chemical Formula 2]

in Chemical Formula 2, $R_1$ is a C8-C24 aliphatic hydrocarbon group, $R_2$ is hydrogen or a C1-C3 aliphatic hydrocarbon group, and n is an integer of 1 to 10.

The compound represented by Chemical Formula 1 or 2 may function as a dispersant for a conjugated diene-based polymer when contained in the rubber composition, whereby desired rolling resistance, vulcanization rate and wear resistance may be obtained.

In Chemical Formula 1 or 2, $R_1$ may be a C8-C24 alkyl group.

In Chemical Formula 1 or 2, $R_2$ may be hydrogen or a C1-C3 alkyl group.

In a preferred embodiment of the present invention, the compound represented by Chemical Formula 1 may be (bis-(2-hydroxyethyl)isotridecyloxypropylamine).

In the rubber composition according to the present invention, the molar ratio of the conjugated diene-based polymer and the compound represented by Chemical Formula 1 or 2 ranges from 1:0.1 to 1:10, or 1:0.5 to 1:2.

The compound represented by Chemical Formula 1 or 2 may be used in an amount of 0.2 to 10 g, and preferably 0.5 to 5 g based on 100 g of the conjugated diene-based polymer.

The conjugated diene-based polymer may be an active polymer having an alkali metal end, formed by polymerizing a conjugated diene monomer or a conjugated diene monomer and an aromatic vinyl monomer.

The conjugated diene monomer may include, but is not necessarily limited to, at least one selected from the group consisting of 1,3-butadiene, 2,3-dimethyl-1,3-butadiene, piperylene, 3-butyl-1,3-octadiene, isoprene, and 2-phenyl-1,3-butadiene.

The conjugated diene monomer may be used in an amount of 60 to 100 wt %, preferably 60 to 85 wt %, and more preferably 60 to 80 wt %, based on 100 wt % in total of the conjugated diene monomer and the aromatic vinyl monomer. When the conjugated diene monomer is used in an amount of 100 wt % based on 100 wt % in total of the conjugated diene monomer and the aromatic vinyl monomer, an active polymer, resulting from polymerizing the conjugated diene monomer alone, without the aromatic vinyl monomer, is provided.

The aromatic vinyl monomer may include at least one selected from the group consisting of styrene, α-methylstyrene, 3-methylstyrene, 4-methylstyrene, 4-propylstyrene, 1-vinylnaphthalene, 4-cyclohexylstyrene, 4-(α-methylphenyl)styrene, and 1-vinyl-5-hexylnaphthalene. Preferably useful is styrene or α-methylstyrene.

The aromatic vinyl monomer may be used in an amount of 0 to 40 wt %, preferably 15 to 40 wt %, and more preferably 20 to 40 wt %, based on 100 wt % in total of the conjugated diene monomer and the aromatic vinyl monomer. When the vinyl aromatic monomer is used in an amount of 0 wt % based on 100 wt % in total of the conjugated diene monomer and the aromatic vinyl monomer, an active polymer, resulting from polymerizing the conjugated diene monomer alone, without the aromatic vinyl monomer, is provided.

The conjugated diene-based polymer may be a modified conjugated diene-based polymer.

The modified conjugated diene-based polymer may be the compound represented by Chemical Formula 3 below:

[Chemical Formula 3]

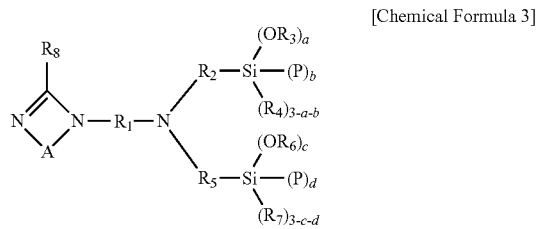

in Chemical Formula 3, $R_1$, $R_2$, and $R_5$ are each independently a C1-C10 alkylene group, $R_3$, $R_4$, $R_6$, and $R_7$ are each independently a C1-C10 alkyl group, $R_8$ is hydrogen or a C1-C10 alkyl group, P is a conjugated diene-based polymer chain, a and c are each independently 0, 1, or 2, b and d are each independently 1, 2, or 3, a+b and c+d are each independently 1, 2, or 3, and A is

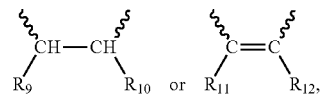

wherein $R_9$, $R_{10}$, $R_{11}$, and $R_{12}$ are each independently hydrogen or a C1-C10 alkyl group.

The conjugated diene-based polymer chain, represented as P in Chemical Formula 3, may be derived from a homopolymer of a conjugated diene monomer or a copolymer of a conjugated diene monomer and a vinyl aromatic monomer.

Specifically, the conjugated diene-based polymer chain may be formed in a manner in which a conjugated diene monomer, or a conjugated diene monomer and a vinyl aromatic monomer, may be polymerized in a batch manner or a continuous manner using a hydrocarbon solvent in the presence of an organo-alkali metal compound, thus obtaining a homopolymer or copolymer having an alkali metal end, which is then reacted with a silyl group substituted with at least one alkoxy group.

As such, the conjugated diene-based polymer chain may be a polymer chain comprising the aromatic vinyl monomer in an amount of 0.0001 to 50 wt %, 10 to 40 wt %, or 20 to 40 wt %, based on 100 wt % in total of the conjugated diene monomer, or the conjugated diene monomer and the vinyl aromatic monomer.

The polymer chain comprising the conjugated diene monomer and the vinyl aromatic monomer may be, for example, a random polymer chain.

The conjugated diene monomer may include at least one selected from the group consisting of 1,3-butadiene, 2,3-dimethyl-1,3-butadiene, piperylene, 3-butyl-1,3-octadiene, isoprene, and 2-phenyl-1,3-butadiene.

The vinyl aromatic monomer may include at least one selected from the group consisting of styrene, α-methylstyrene, 3-methylstyrene, 4-methylstyrene, 4-propylstyrene, 1-vinylnaphthalene, 4-cyclohexylstyrene, 4-(α-methylphenyl)styrene, and 1-vinyl-5-hexylnaphthalene. Particularly useful is styrene or α-methylstyrene.

The modified conjugated diene-based polymer may have a Mooney viscosity of 40 or more, preferably from 40 to 90, and more preferably from 50 to 80.

The modified conjugated diene-based polymer has a number average molecular weight (Mn) of 1,000 to 2,000,000 g/mol, preferably 10,000 to 1,000,000 g/mol, more preferably 100,000 to 1,000,000 g/mol, and most preferably 100,000 to 500,000 g/mol or 200,000 to 700,000 g/mol.

The modified conjugated diene-based polymer has a vinyl content of 18 wt % or more, preferably 25 wt % or more, and more preferably 30 to 70 wt %. Given the above vinyl content range, the glass transition temperature of the polymer may be elevated. Thus, when such a polymer is applied to tires, the properties required of tires, such as running resistance and wet grip, may be satisfied, and superior fuel economy may result.

The vinyl content refers to the amount of a monomer having a vinyl group, or the amount not of 1,4-added conjugated diene monomer but of 1,2-added conjugated diene monomer, based on 100 wt % of the conjugated diene monomer.

The modified conjugated diene-based polymer has a polydispersity index (PDI) of 1 to 10, preferably 1 to 5, and more preferably 1 to 2.

The compound represented by Chemical Formula 3 may be the compound represented by Chemical Formula 4 or Chemical Formula 5 below:

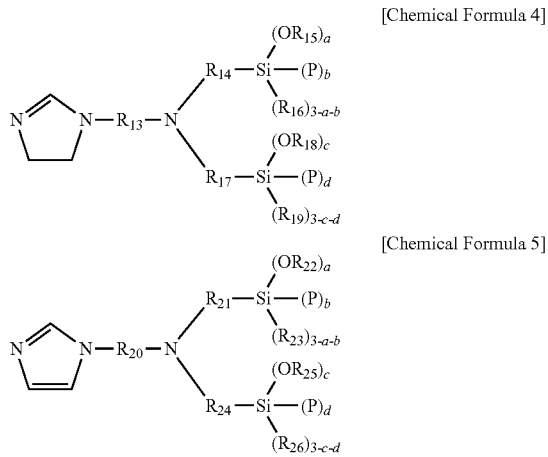

[Chemical Formula 4]

[Chemical Formula 5]

in Chemical Formulas 4 and 5, $R_{15}$, $R_{16}$, $R_{18}$, $R_{19}$, $R_{22}$, $R_{23}$, $R_{25}$, and $R_{26}$ are each independently a C1-C5 alkyl group, $R_{13}$, $R_{14}$, $R_{17}$, $R_{20}$, $R_{21}$, and $R_{24}$ are each independently a C1-C5 alkylene group, P is a conjugated diene-based polymer chain, a and c are each independently 0, 1, or 2, b and d are each independently 1, 2, or 3, and a+b and c+d are each independently 1, 2, or 3.

Also, the compound represented by Chemical Formula 3 may be the compound represented by Chemical Formula 6 or Chemical Formula 7 below:

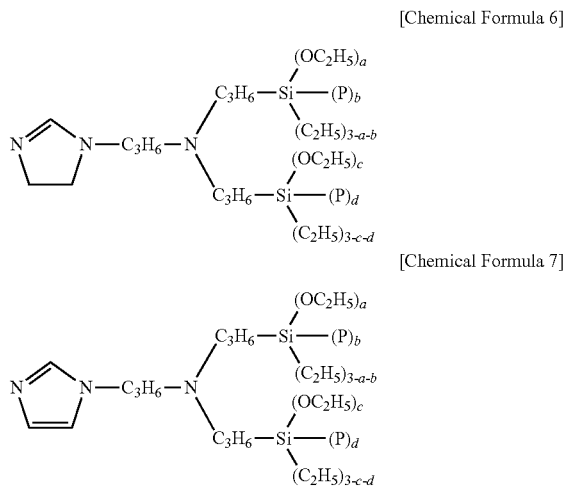

[Chemical Formula 6]

[Chemical Formula 7]

in Chemical Formulas 6 and 7, P is a conjugated diene-based polymer chain, a and c are each independently 0, 1, or 2, b and d are each independently 1, 2, or 3, and a+b and c+d are each independently 1, 2, or 3.

Specifically, the compound represented by Chemical Formula 3 may be the compound represented by Chemical Formula 8 or Chemical Formula 9 below:

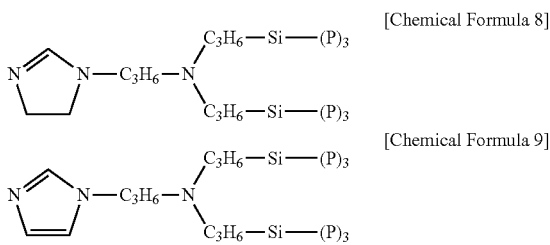

[Chemical Formula 8]

[Chemical Formula 9]

in Chemical Formulas 8 and 9, P is a conjugated diene-based polymer chain.

The rubber composition according to the present invention may further comprise an inorganic filler. The amount of the inorganic filler may be 10 to 150 parts by weight, or 50 to 100 parts by weight, based on 100 parts by weight of the modified conjugated diene-based polymer.

The inorganic filler may include carbon black, silica or a mixture thereof.

The inorganic filler may be silica. As such, dispersibility is significantly increased, and the end of the modified conjugated diene-based polymer of the invention may be coupled (sealed) with silica particles, thus significantly decreasing hysteresis loss.

The rubber composition according to the present invention may further comprise an additional conjugated diene-based polymer.

Examples of the additional conjugated diene-based polymer may include SBR (styrene-butadiene rubber), BR (butadiene rubber), natural rubber, and mixtures thereof.

SBR may be exemplified by SSBR (solution styrene-butadiene rubber).

The rubber composition according to the present invention may comprise 20 to 100 parts by weight of the modified conjugated diene-based polymer and 0 to 80 parts by weight of the additional conjugated diene-based polymer.

Alternatively, the rubber composition according to the present invention may comprise 20 to 99 parts by weight of the modified conjugated diene-based polymer and 1 to 80 parts by weight of the additional conjugated diene-based polymer.

Also, the rubber composition according to the present invention may further comprise 1 to 100 parts by weight of oil.

The oil may be exemplified by mineral oil or a softener.

The oil may be used in an amount of 10 to 100 parts by weight, or 20 to 80 parts by weight, based on 100 parts by weight of the conjugated diene-based polymer. Given the above oil content range, desired properties may be exhibited, and the rubber composition may be appropriately softened, thus increasing processability.

The rubber composition according to the present invention may be used as a material for a tire or tire tread.

The present invention addresses a tire or tire tread, including the above rubber composition.

MODE FOR INVENTION

A better understanding of the present invention may be obtained via the following examples, which are merely set forth to illustrate the present invention, and those skilled in the art will appreciate that various changes and modifications are possible, without departing from the scope and spirit of the invention as disclosed in the accompanying claims.

Example 1

Three reactors were prepared. Among them, the first and the second reactor were used as polymerization reactors, and the third reactor was used as a modification reactor.

Styrene, 1,3-butadiene, and n-hexane, without impurities such as water, were mixed at rates of 2.66 kg/h, 5.1 kg/h, and 41.8 kg/h, respectively, before being placed in the reactors. The resulting mixed solution was continuously fed into the first reactor. Subsequently, 2,2-bis(2-oxolanyl)propane as a polar additive and n-butyllithium were fed at rates of 13.09 g/h and 4.31 g/h, respectively, into the first reactor, and the temperature inside the reactor was adjusted to 70° C.

The polymer output from the first reactor was continuously fed into the upper portion of the second reactor, and the polymerization reaction was carried out while the temperature was maintained at 85° C. The polymer output from the second reactor was continuously fed into the upper portion of the third reactor, N,N-bis(triethoxysilylpropyl)aminopropyl-1-imidazole was continuously fed at a rate of 18.48 g/h, and the modification reaction was carried out. To the polymer output from the third reactor, a mixed solution of isopropylalcohol and an antioxidant (Wingstay-K) at 8:2 was added at a rate of 32.5 g/h to stop the polymerization reaction, yielding a polymer.

100 parts by weight of the polymer thus obtained was mixed with 1 phr of bis-(2-hydroxyethyl)isotridecyloxypropylamine, added to water warmed with steam, stirred to remove the solvent, and then roll dried to remove the remaining solvent and water, yielding a modified conjugated diene-based polymer. The results of analysis of the modified conjugated diene-based polymer thus obtained are shown in Table 1 below.

Example 2

A conjugated diene-based polymer was prepared in the same manner as in Example 1, with the exception that 1.5 phr of bis-(2-hydroxyethyl)isotridecyloxypropylamine was added.

Example 3

A conjugated diene-based polymer was prepared in the same manner as in Example 1, with the exception that 1 phr of oleylbis-(2-hydroxyethyl)amine was added.

Example 4

A conjugated diene-based polymer was prepared in the same manner as in Example 1, with the exception that 1.5 phr of oleylbis-(2-hydroxyethyl)amine was added.

Comparative Example 1

A conjugated diene-based polymer was prepared in the same manner as in Example 1, with the exception that no dispersant was used.

The conjugated diene-based polymers of Examples 1 to 4 and Comparative Example 1 were analyzed through the following methods.

a) Mooney viscosity: two samples having a weight of 15 g or more were preheated for 1 min and then measured at 100° C. for 4 min using an MV-2000, made by ALPHA Technologies.

b) Styrene monomer (SM) and Vinyl content: measurement was conducted using NMR.

c) Weight average molecular weight (Mw), Number average molecular weight (Mn), and Polydispersity Index (PDI): measurement was conducted via GPC at 40° C. The column used herein was a combination of two PLgel Olexis columns and one PLgel mixed-C column, made by Polymer Laboratories, and all of the replaced columns were mixed bed-type columns. Also, polystyrene (PS) was the GPC standard material for the calculation of molecular weight.

TABLE 1

|  |  | Example | | | | C. Ex. |
|---|---|---|---|---|---|---|
|  |  | 1 | 2 | 3 | 4 | 1 |
| Sample |  | A | B | C | D | E |
| Modifier (a) (g/hr) |  | 18.5 | 18.5 | 18.5 | 18.5 | 18.5 |
| Dispersant (b) | Phr | 1.0 | 1.5 | — | — | — |
| Dispersant (c) | Phr | — | — | 1.0 | 1.5 | — |
| Mooney viscosity (MV) |  | 51 | 50 | 120 | 120 | 53 |
| NMR (%) | SM | 33.6 | 33.4 | 34.3 | 34.3 | 33.4 |
|  | Vinyl | 38.0 | 37.9 | 37.5 | 37.5 | 38.0 |
| GPC ($\times 10^4$) | Mn | 41.9 | 41.3 | 33.0 | 33.1 | 40.5 |
|  | Mw | 91.8 | 92.2 | 77.5 | 80.3 | 87.7 |
|  | PDI | 2.2 | 2.2 | 2.4 | 2.4 | 2.2 |

(a) N,N-bis(triethoxysilylpropyl)aminopropyl-1-imidazole
(b) bis-(2-hydroxyethyl)isotridecyloxypropylamine
(c) oleylbis(2-hydroxyethyl)amine

Preparation Examples 1 to 4 and Comparative Preparation Example 1 Preparation of Rubber Composition The conjugated diene-based polymer rubber compositions of Preparation Examples 1 to 4 and Comparative Preparation Example 1 were prepared using samples A, B, C and D shown in Table 1, as raw rubber, under the mixing conditions shown in Table 2 below.

The conjugated diene-based polymer rubber composition was kneaded as follows. Specifically, upon primary kneading, raw rubber (conjugated diene-based polymer), a filler, an organosilane coupling agent, oil, zinc oxide, a stearic acid antioxidant, an anti-aging agent, wax and an accelerator were kneaded at 80 rpm using a Banbury mixer provided with a temperature controller. For this, the temperature of the kneader was controlled, and a first mixture was obtained at a discharge temperature of 140 to 150° C. Upon secondary kneading, the first mixture was cooled to room temperature, after which rubber, sulfur and a vulcanization accelerator were placed in the kneader, and a second mixture was obtained at a discharge temperature of 45 to 60° C. Upon tertiary kneading, the second mixture was molded and vulcanized at 180° C. for T90+10 min using a vulcanization press, thereby manufacturing vulcanized rubber.

TABLE 2

| (unit: parts by weight) | S-1 |
|---|---|
| Rubber | 100.0 |
| Silica | 70.0 |
| Coupling agent | 11.02 |
| Oil | 37.5 |

TABLE 2-continued

| (unit: parts by weight) | S-1 |
|---|---|
| Zinc oxide | 3.0 |
| Stearic acid | 2.0 |
| Antioxidant | 2.0 |
| Anti-aging agent | 2.0 |
| Wax | 1.0 |
| Rubber accelerator | 1.75 |
| Sulfur | 1.5 |
| Vulcanization accelerator | 2.0 |
| Total weight | 233.77 |

The properties of the manufactured vulcanized rubber were measured through the following methods.

1) Tensile Testing

According to the tensile testing method of ASTM 412, the tensile strength upon cutting a vulcanized rubber sample and tensile stress (300% modulus) at 300% elongation were measured.

2) Viscoelasticity

A dynamic mechanical analyzer made by TA was used. When undergoing strain under conditions of a frequency of 10 Hz in a distortion mode and a measurement temperature ranging from 0 to 60° C., the Tan δ of each sample was measured. The Payne effect was represented by the difference between the minimum and the maximum in the strain sweep range of 0.2 to 40%. The lower the Payne effect, the higher the dispersibility of the filler such as silica. When Tan δ at 0° C., which is a low temperature, was increased, wet skid resistance became superior, and when Tan δ at 60° C., which is a high temperature, was decreased, hysteresis loss was reduced, resulting in low rolling resistance of tires and thus superior fuel economy. Table 3 below shows the properties of the vulcanized rubber.

3) Rolling Resistance (RR) and Wet Grip

The rolling resistance (RR) and wet grip of rubber were measured using DMTS (Dynamic mechanical thermal spectrometry; GABO, EPLEXOR 500N). The measurement conditions were as follows: frequency: 10 Hz, strain (static strain: 3%, dynamic strain: 0.25%), and temperature: −60 to 70° C. As such, RR was determined based on Tan δ at 60° C., and wet grip was determined based on Tan δ at 0° C. These values were represented as indexes relative to the value of Comparative Example 1, which was set to 100.

TABLE 3

|  | Prep. Ex. 1 | Prep. Ex. 2 | Prep. Ex. 3 | Prep. Ex. 4 | C. Prep. Ex. 1 |
|---|---|---|---|---|---|
| Sample | A | B | C | D | E |
| 300% Modulus (Kgf/cm$^2$) | 133 | 126 | 101 | 103 | 100 |
| Tanδ at 0° C. (Index) | 106 | 102 | 102 | 103 | 100 |
| Tanδ at 60° C. (Index) | 114 | 117 | 104 | 107 | 100 |

As is apparent from the results of Table 3, compared to Comparative Preparation Example 1, the rubber compositions of Preparation Examples 1 to 4 according to the present invention were increased in 300% modulus (tensile stress) and exhibited high Tan δ at 0° C. (Index). Thus, when the modified conjugated diene-based polymer of the invention was used for a tire, desired wet skid resistance resulted.

Compared to Comparative Preparation Example 1, the rubber compositions of Preparation Examples 1 to 4 according to the present invention exhibited high Tan δ at 60° C. (Index). Thus, when the modified conjugated diene-based polymer of the invention was used for a tire, desired rolling resistance resulted.

The invention claimed is:

1. A rubber composition, comprising a conjugated diene-based polymer and a compound represented by Chemical Formula 1 below:

[Chemical Formula 1]

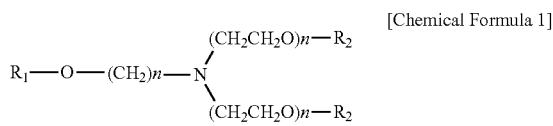

in Chemical Formula 1, $R_1$ is a C8-C24 aliphatic hydrocarbon group, $R_2$ is hydrogen or a C1-C3 aliphatic hydrocarbon group, and n and n' are each independently an integer of 1 to 10.

2. The rubber composition of claim 1, wherein the conjugated diene-based polymer is a modified conjugated diene-based polymer.

3. The rubber composition of claim 2, wherein the modified conjugated diene-based polymer is a compound represented by Chemical Formula 3 below:

[Chemical Formula 3]

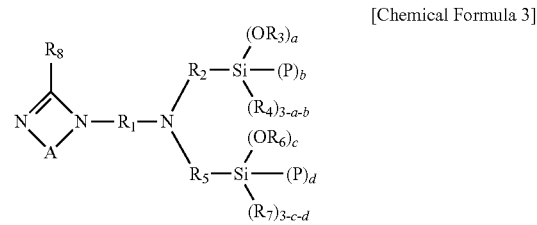

in Chemical Formula 3, $R_1$, $R_2$, and $R_5$ are each independently a C1-C10 alkylene group, $R_3$, $R_4$, $R_6$, and $R_7$ are each independently a C1-C10 alkyl group, $R_8$ is hydrogen or a C1-C10 alkyl group, P is a conjugated diene-based polymer chain, a and c are each independently 0, 1, or 2, b and d are each independently 1, 2, or 3, a+b and c+d are each independently 1, 2, or 3, and A is

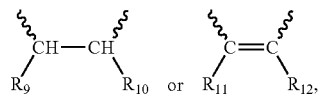

wherein $R_9$, $R_{10}$, $R_{11}$, and $R_{12}$ are each independently hydrogen or a C1-C10 alkyl group.

4. The rubber composition of claim 2, wherein the modified conjugated diene-based polymer has a number average molecular weight of 1,000 to 2,000,000 g/mol.

5. The rubber composition of claim 3, wherein the compound represented by Chemical Formula 3 is a compound represented by Chemical Formula 4 or Chemical Formula 5 below:

[Chemical Formula 4]

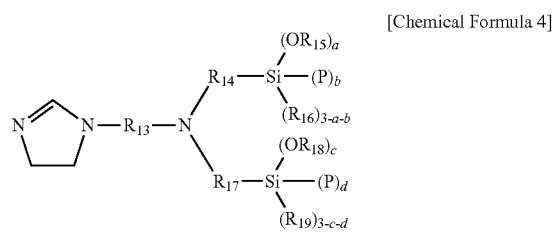

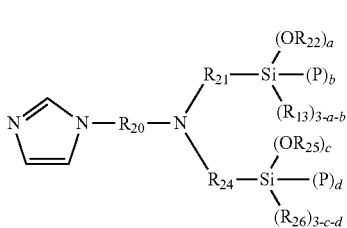

[Chemical Formula 5]

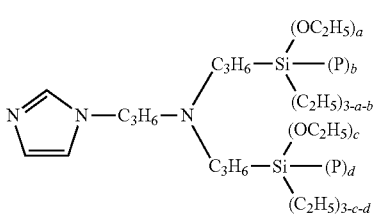

[Chemical Formula 7]

in Chemical Formulas 4 and 5, $R_{15}$, $R_{16}$, $R_{18}$, $R_{19}$, $R_{22}$, $R_{23}$, $R_{25}$, and $R_{26}$ are each independently a C1-C5 alkyl group, $R_{13}$, $R_{14}$, $R_{17}$, $R_{20}$, $R_{21}$, and $R_{24}$ are each independently a C1-C5 alkylene group, P is a conjugated diene-based polymer chain, a and c are each independently 0, 1, or 2, b and d are each independently 1, 2, or 3, and a+b and c+d are each independently 1, 2, or 3.

6. The rubber composition of claim 3, wherein the compound represented by Chemical Formula 3 is a compound represented by Chemical Formula 6 or Chemical Formula 7 below:

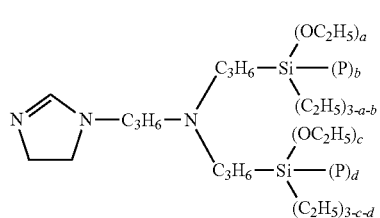

[Chemical Formula 6]

in Chemical Formulas 6 and 7, P is a conjugated diene-based polymer chain, a and c are each independently 0, 1, or 2, b and d are each independently 1, 2, or 3, and a+b and c+d are each independently 1, 2, or 3.

7. The rubber composition of claim 3, wherein the compound represented by Chemical Formula 3 is a compound represented by Chemical Formula 8 or Chemical Formula 9 below:

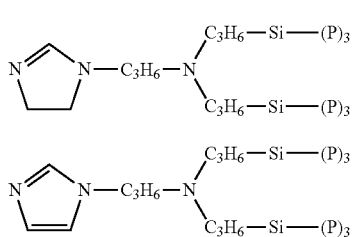

[Chemical Formula 8]

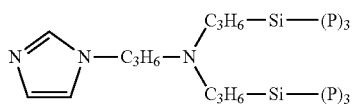

[Chemical Formula 9]

in Chemical Formulas 8 and 9, P is a conjugated diene-based polymer chain.

8. A tire or tire tread, comprising the rubber composition of claim 1.

* * * * *